United States Patent [19]

Gilliam

[11] Patent Number: 4,463,428
[45] Date of Patent: Jul. 31, 1984

[54] AIRCRAFT WEIGHT AND CENTER OF GRAVITY COCKPIT READOUT SYSTEM

[75] Inventor: Raymond J. Gilliam, Stratford, Conn.

[73] Assignee: The United States of America as represented by the Secretary of the Navy, Washington, D.C.

[21] Appl. No.: 314,616

[22] Filed: Oct. 26, 1981

[51] Int. Cl.³ ............................................. G01M 1/12
[52] U.S. Cl. .......................... 364/463; 364/567; 235/61 T; 73/65
[58] Field of Search ........................ 364/463, 466, 567; 340/27 R, 666; 235/61 T; 73/65; 177/25

[56] References Cited

U.S. PATENT DOCUMENTS

| | | | |
|---|---|---|---|
| 2,559,718 | 5/1944 | Goodlett et al. | 73/65 |
| 2,987,254 | 6/1961 | Kolisch | 364/463 |
| 3,584,503 | 6/1971 | Senour | 73/65 |
| 3,701,279 | 10/1972 | Harris et al. | 73/65 |
| 3,746,844 | 7/1973 | Azum et al. | 340/27 R |
| 4,034,334 | 7/1977 | Allyn | 340/27 R |
| 4,110,605 | 8/1978 | Miller | 73/65 |
| 4,225,926 | 9/1980 | Wendt | 364/463 |

*Primary Examiner*—Gary Chin
*Attorney, Agent, or Firm*—Robert F. Beers; Arthur A. McGill; Michael J. McGowan

[57] ABSTRACT

An aircraft system which provides the pilot with a continuous cockpit readout of the weight and center of gravity of an aircraft carrying an externally lifted load together with the impact on aircraft controllability of load shifts and fuel burnoff, by transmitting input signals from load cells installed in the lifting hook system, input signals from a fuel totalizer, and input data from a system keyboard to a system computer.

4 Claims, 1 Drawing Figure

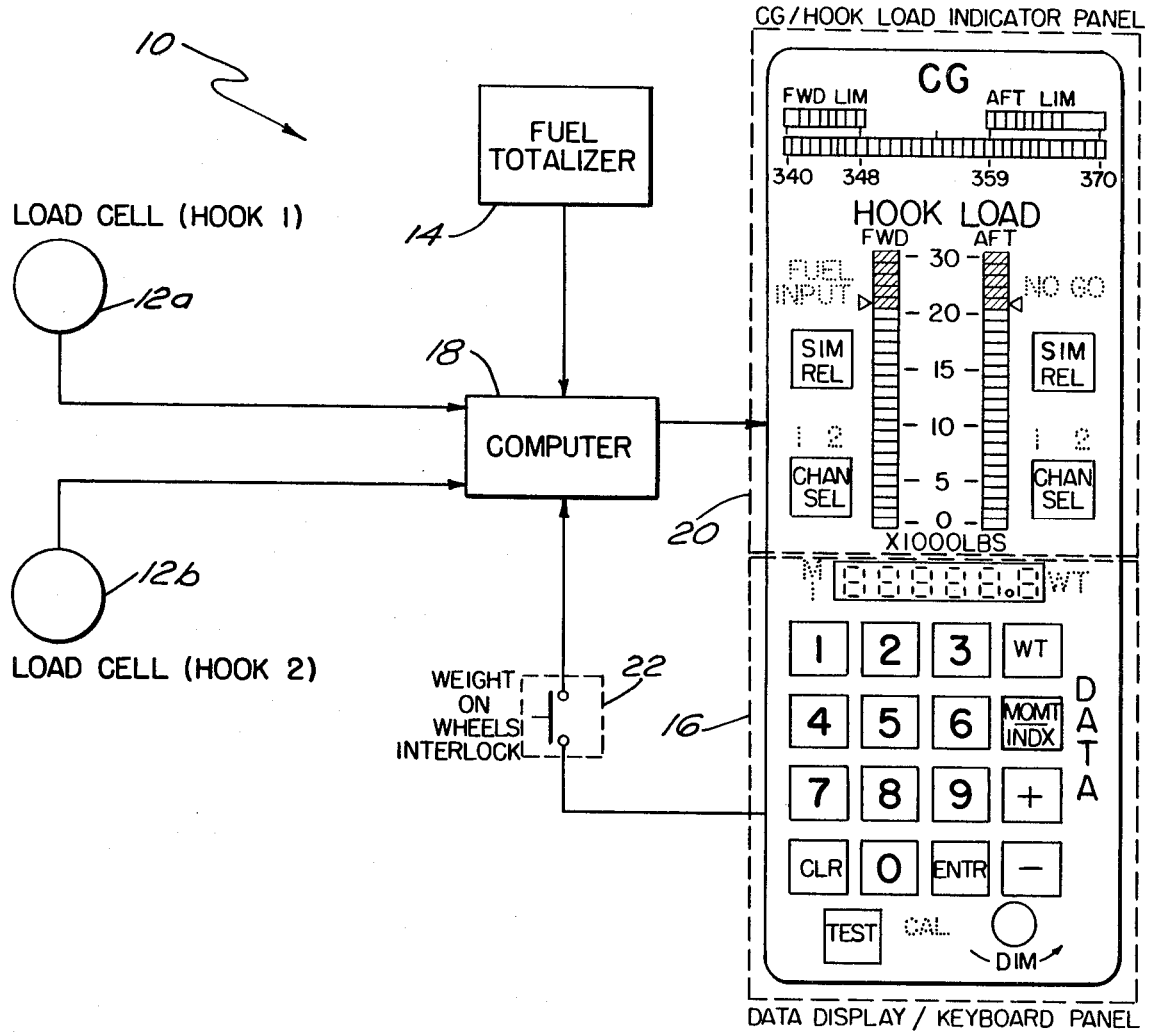

AIRCRAFT WEIGHT AND CENTER OF GRAVITY COCKPIT READOUT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to an aircraft system weight and center of gravity (c.g.) cockpit readout device and more particularly to an aircraft system which provides the pilot with a continuous cockpit readout of the weight and center of gravity of an externally lifted load, and its impact on aircraft controllability, by coupling input signals from load cells installed in the hook system, input signals from the fuel totalizer and input data signals from a system keyboard to a system computer.

(2) Description of the Prior Art

Presently, pilots use a slide rule method to determine the acceptability of the aircraft center of gravity prior to take-off without an external load and then assume the effect thereon of the load to be picked up. No allowance is made for in-flight load shifts or the effect that expending fuel has on shifting the aircraft c.g. The inaccuracy of such a method is obvious and has at times caused serious safety problems.

SUMMARY OF THE INVENTION

In the system of the instant invention a pilot manually inputs total aircraft internal load (excluding fuel) and internal load center of gravity prior to takeoff using a keyboard. After takeoff, this information along with continuously updated input signals from hook system load cells and the fuel totalizer are fed to an onboard computer, the output of which is fed to a weight and center of gravity indicator, the readout of which enables the pilot to assess aircraft stability and controllability and make necessary control adjustments, both in flight and during takeoff/landing with an external load, to insure safety of operation. Typical system use includes determining the aircraft approach to or takeoff from an inclined landing area with the load suspended from both hooks of a two-point system, by advising the pilot which end of the load should be landed/lifted first.

Accordingly, an object of subject invention is to provide a pilot with a continuous readout of aircraft weight and center of gravity on the ground and in the air.

Another object of subject invention is to account for the effects of load shifts and weight distribution on cargo hooks together with the effect on overall aircraft weight and center of gravity of loss of weight due to expended fuel.

A still further object of subject invention is to improve the safety of aircraft takeoff and landings while transporting an external, suspended cargo.

Other objects, advantages and novel features of the invention will become apparent from the following detailed description when considered in conjunction with the single accompanying drawing.

BRIEF DESCRIPTION OF THE DRAWING

The sole FIGURE is a block diagram of a device built according to the teaching of subject invention.

DESCRIPTION OF THE PREFERRED EMBODIMENT

The purpose of the system of the instant invention is to provide the pilot wth a continuous cockpit readout of the weight and center of gravity (c.g.) of an external, lifted load and its impact on aircraft controllability and stability, and hence safety. In an external cargo pickup system it is desirable to know what external load is applied to the aircraft. For even a two-point pickup system for example the loadability of the aircraft becomes complex due to the potential for center of gravity variances in the loads to be lifted which will substantially affect the controllability of the aircraft. A well known example of an aircraft which would carry an external load on cargo hooks while in flight is a helicopter. In the present invention, load cells are placed in the lifting hook system to produce continuous signals which represent the lifted external load weight and c.g. which signals are relayed to a system computer. Also coupled to this computer are signals from the fuel totalizer system to account for c.g. variances due to fuel burn-off. Additionally, the weight of the basic aircraft and equipment items are inputed prior to takeoff from a system keyboard in order to provide the pilot with the capability of continuous readout of overall aircraft weight and c.g. throughout the entire mission. A weight on wheels interlock switch prevents additional data entry to the computer from the keyboard after takeoff.

Referring now to the sole FIGURE, there is shown an aircraft weight and center of gravity cockpit readout system 10 comprising load cells 12a and 12b, fuel totalizer 14, data display/keyboard panel 16, computer 18, c.g./hook load indicator panel 20 and weight on wheels interlocks 22.

The c.g., hook load and weight (WT) displays are continuously updated during flight taking into account initial weight and balance takeoff data, instantaneous cargo hook load data and fuel remaining after burnoff. If c.g. or cargo hook limits are exceeded, the system provides visual warnings. The system monitors fuel quantity outputs from fuel quantity gages. A weight-on-wheels interlock prevents data alterations from the keyboard while in flight. The load cell sensors provide electrical outputs proportional to the applied tension load. The load sensors in each cargo hook share the total hook load outputs from each sensor and are combined in the system to obtain the total load. Power or excitation for the load sensors are provided by the system.

Obviously, many modifications and variations of the present invention are possible in light of the above teachings. For example, the number of pickup hooks can be varied. Also, the quantity of sensors per pickup hook can be increased. The aircraft weight and c.g., absent the cargo, may be provided using load cells in the landing wheel struts. Additionally, one may also input using the keyboard, aircraft weight and c.g. and then individually include the weight of crew, passengers, mission equipment and miscellaneous items. It is therefore understood that within the scope of the appended claims the invention may be practiced otherwise than specifically described.

What is claimed is:

1. An in-flight aircraft weight and center of gravity cockpit readout device comprising:
   a plurality of lifting hooks for attaching to and lifting a load external to said aircraft;
   a plurality of load measuring means, adapted to sense the weight of said external load suspended from said lifting hooks, for continuously producing a first electrical signal proportional to said weight during the in-flight time of said aircraft;
   fuel measuring means for continuously producing a second electrical signal proportional to the amount of fuel remaining in said aircraft's fuel tanks during the in-flight time of said aircraft;
   keyboard input means for providing a third electrical signal proportional to said aircraft's weight and center of gravity prior to the takeoff of said aircraft lifting of said external load;
   means for receiving and processing said first, second and third electrical signals from said plurality of load measuring means, said fuel measuring means and said keyboard input means respectively to produce a combined weight and center of gravity output signal;
   indicator means for receiving and displaying said combined weight and center of gravity output signal from said microprocessor means and weight on wheels interlock switch, connected between said microprocessor means and a weight on wheels interlock switch, connected between said microprocessor means and said keyboard input means, for disabling said keyboard input means while said aircraft is in flight thus preventing data alterations from being entered therefrom.

2. An aircraft weight and center of gravity cockpit readout device according to claim 1 wherein said plurality of load measuring means are load cells.

3. An aircraft weight and center of gravity cockpit readout device according to claim 2 wherein said fuel measuring means is a fuel totalizer.

4. An aircraft weight and center of gravity cockpit readout device according to claim 3 wherein said indicator means further comprises:
   a center of gravity location display for showing the combined center of gravity of said aircraft and said external load;
   a hook load display; and
   selecting means for selecting the hook load to be displayed.

* * * * *